United States Patent
Wemple

[11] Patent Number: 5,992,586
[45] Date of Patent: Nov. 30, 1999

[54] EDGE-RELIEVED CAM BREAK ROLLER

[75] Inventor: Jonathon L. Wemple, Rochester Hills, Mich.

[73] Assignee: Meritor Heavy Vehicle Systems, LLC, Troy, Mich.

[21] Appl. No.: 08/696,283

[22] Filed: Aug. 13, 1996

[51] Int. Cl.⁶ .................................................. F16D 51/22
[52] U.S. Cl. .......................................................... 188/330
[58] Field of Search .................... 188/324, 329, 188/730, 372; 74/569

[56] References Cited

U.S. PATENT DOCUMENTS

| | | |
|---|---|---|
| 3,196,987 | 7/1965 | Moore et al. . |
| 3,275,103 | 9/1966 | Lyon ........................................ 188/332 |
| 3,368,648 | 2/1968 | Brownyer ................................. 188/330 |
| 3,469,660 | 9/1969 | Mathers . |
| 4,503,953 | 3/1985 | Majewski ............................ 188/332 X |
| 4,807,729 | 2/1989 | Sampson . |
| 4,932,505 | 6/1990 | Epperly . |
| 5,255,763 | 10/1993 | Redgrave et al. . |
| 5,531,137 | 7/1996 | Guilford ..................................... 74/569 |
| 5,638,928 | 6/1997 | Wemple .................................. 188/329 |

FOREIGN PATENT DOCUMENTS

| | | |
|---|---|---|
| 941957 | 5/1922 | France ..................................... 188/330 |
| 2903965 | 2/1979 | Germany . |
| 4300540 | 4/1994 | Germany . |
| 1396473 | 3/1973 | United Kingdom . |
| 1602333 | 11/1981 | United Kingdom . |

*Primary Examiner*—Robert J. Oberleitner
*Attorney, Agent, or Firm*—Howard & Howard

[57] ABSTRACT

An improved roller for a cam actuated brake system includes rounded edges for contacting the cam. In the prior art, a sharp edge was sometimes damaged when force inequalities were applied from the shoe to the roller. The present invention rounded edges ensure that when there are force inequalities, the contact between the rollers and the cam is over a relatively great surface, and is less likely to damage the roller.

14 Claims, 2 Drawing Sheets

EDGE-RELIEVED CAM BREAK ROLLER

BACKGROUND OF THE INVENTION

This invention relates to a unique roller for a cam brake wherein the edges are rounded to relieve potential strains and stresses.

Cam brakes are widely used in heavy vehicle braking systems. Essentially, a rotating cam is controlled by a brake actuator. Rotation of the cam causes two rollers to move radially inwardly or outwardly. The rollers in turn, move brake shoes to pivot and bring friction surfaces into contact with a wheel drum. The friction surfaces thus retard rotation of the drum.

Certain deficiencies exist with the known cam brake systems. In particular, the rollers act as an interface between the brake shoes and the cam. Spring forces on the shoes apply a force to the rollers. Rotation of the cam applies an actuating force to the rollers in a direction opposed to that from the shoes. Large forces are thus transferred through the rollers. Typically, the rollers include relatively small shafts mounting brake shoe webs at two axially spaced locations. A relatively greater diameter portion of the roller contacts the cam.

Due to manufacturing tolerances and assembly inaccuracies, it will often occur that the force from the two webs of the brake shoe are unequally distributed to the rollers. When this occurs, the roller may sometimes become skew or misaligned such that only an edge of the roller contacts the cam. That is, there is effective line contact between the roller and the cam at one edge of the roller. This is undesirable, and can lead to fracturing of the roller, thus limiting its life. While some rollers may have chamfered edges or even rounded surfaces, these have not been over a sufficient distance or at proper locations to act as a cam contacting surface.

SUMMARY OF THE INVENTION

The present invention improves cam brake rollers. In particular, the inventive roller includes an outer peripheral surface having a central generally cylindrical portion for contacting the cam. Curved edge surfaces extend radially inwardly to approach the radially smaller shaft portions that mount the brake shoe webs. The curved edge surfaces ensure that unequal distribution of force from the brake shoe to the roller will not result in an edge of the roller contacting the cam. Rather, the curved edge surfaces contact the cam if there is a force imbalance, transferring the forces over a relatively greater surface. Moreover, the curved surface is less prone to fracture than a sharp edge. Thus, by eliminating the sharp roller edges, the likelihood of damage to the roller at the edges is greatly reduced.

In preferred embodiments of this invention, the central portion of the cam contracting surface remains cylindrical. The curved edge surfaces curve radially inwardly from the central portion. Preferably, the curved edge surfaces account for more than one-half of the total axial distance of the cam contacting surface. In particular, each of the curved edge surfaces preferably extend for an axial distance that is at least one-half of the axial length of the central portion. In this way, the invention ensures that there is a sufficient length to the curved edge surfaces such that even large force imbalances transmitted to the roller still result in adequate contact between the roller and the cam. In addition, the radius of curvature of the curved edge portions is preferably great enough so that the curves are relatively gradual rather than sharp. A sharp drop away would not result in a reliable cam contacting surface at the edges. Instead, the gradual curve utilized in the present invention will insure that there is adequate cam contacting surfaces at the curved edge surfaces.

In a further feature of this invention, the curved surface leads to a ledge which then extends radially inwardly to the brake shoe shaft. In this way, the roller ensures a reliable mounting location for the brake shoe.

These and other features of the present invention can be best understood from the following specification and drawings, the following of which is a brief description.

DETAILED DESCRIPTION OF PREFERRED EMBODIMENTS

Figure 1:
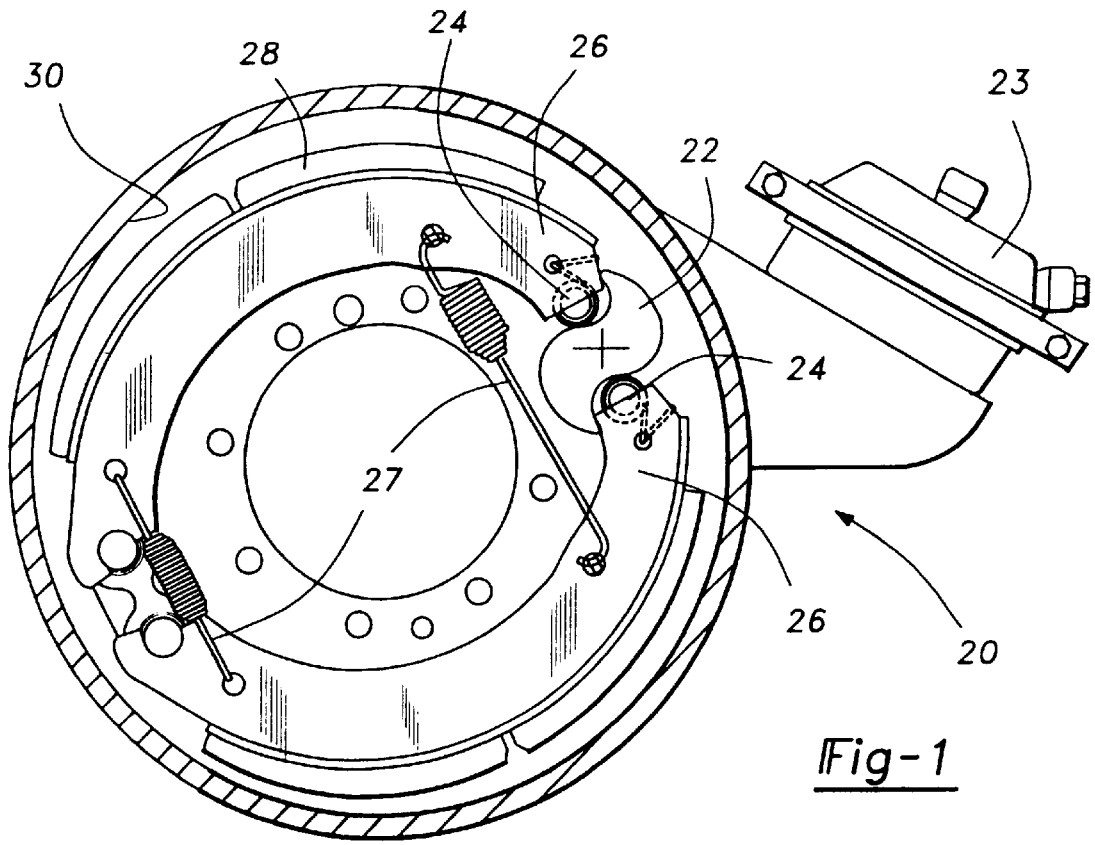
FIG. 1 shows a standard cam brake system.

A cam brake system 20 is illustrated in FIG. 1. An S-cam 22 is rotated by a brake actuator 23. Rotation of cam 22 causes rollers 24 to move radially outwardly of a rotation axis of the cam 22. Brake shoes 26 have webs received on end shafts of the rollers 24. When a roller 24 moves radially outwardly, it brings a shoe 26 radially outwardly against the force of springs 27. This causes a friction material 28 formed on an outer surface of the shoe 26 to come into contact with an inner peripheral surface of a drum 30 to retard rotation of a wheel fixed to the drum 30.

Figure 2:
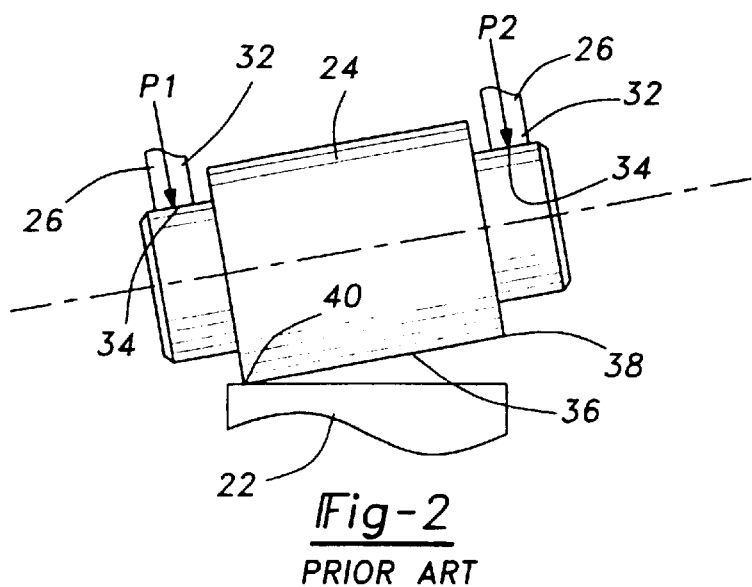
FIG. 2 shows a problem with the prior art systems.

The standard roller 24 experiences a problem that will be best understood from FIG. 2. Roller 24 mounts two spaced webs 32 from a brake shoe 26 at shafts 34. The webs apply forces P1 and P2 to the shafts 34. The roller 24 also includes a cylindrical outer peripheral surface 36 which typically contacts the cylindrical actuation surface 37 of cam 22. The roller 24 thus includes two sharp edges 38 and 40 at its extreme axial ends. Should the force P1 be much greater than the force P2, then the roller may move to a position such as shown in FIG. 2. The amount of cocking of the roller 24 shown in FIG. 2 may not be actually experienced in practice, but is exaggerated to illustrate the problem solved by the present invention. As shown in FIG. 2, the sharp edge 40 is now forced into contact with surface 37 on cam 22. Sharp edge 40 is thus subject to crushing or fracture. This has sometimes led to undesirably short life for the prior art rollers.

Figure 3:
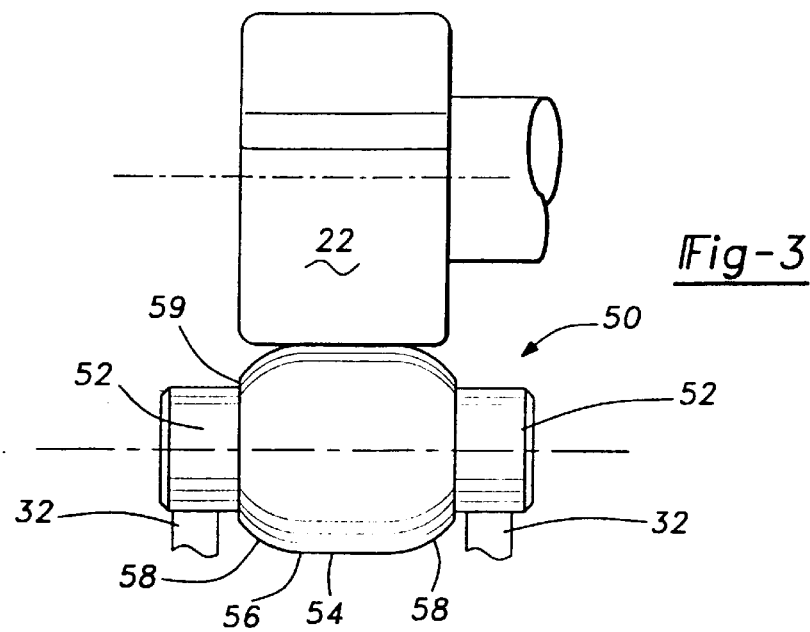
FIG. 3 shows the inventive brake roller.

The present invention includes an improved roller 50 as shown in FIG. 3. Web mounting shafts 52 are formed at the edges of the roller 50. The outer peripheral surface 54 includes a central cam contacting cylindrical portion 56. Curved edge surfaces 58 curve away from the central cylindrical portion 56. One of the edge surfaces 58 contact surface 37 of cam 22 in the event that there is a force imbalance. Ledge 59 leads from the curved surfaces 58 to the shafts 52. The ledge 59 ensure a reliable mounting surface for the webs 32.

Figure 4:
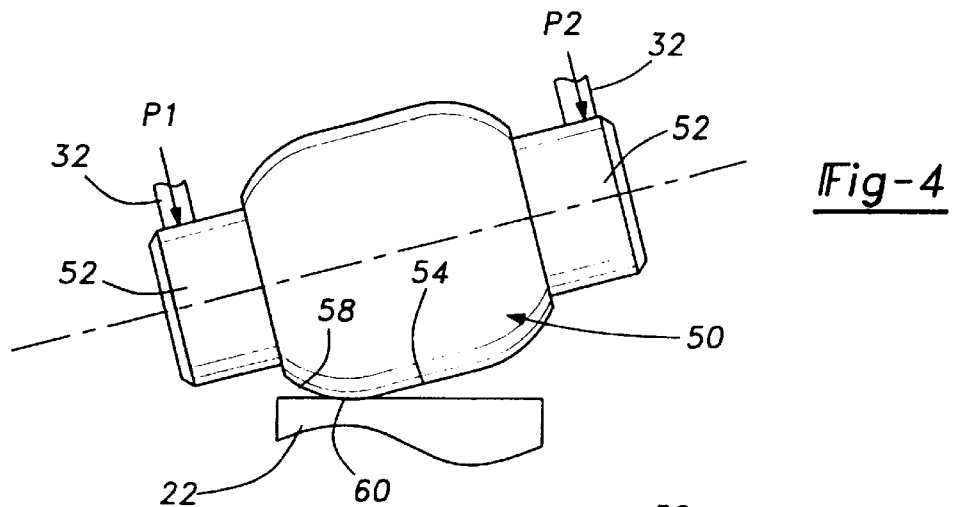
FIG. 4 shows the inventive roller overcoming the problem illustrated in FIG. 2.

As shown in FIG. 4, Forces P1 and P2 are distributed to the roller 50 from the webs 32. The forces are shown unbalanced, with force P1 being much greater than force P2. An area 60 of the roller on its curved surface 58 contacts the cam 22. Due to the contact at the curved surface, there is greater surface area contacting cylindrical surface 37 on cam 22. Further, there is no sharp edge, which is likely to be crushed or fractured as was the case in the prior art.

Figure 5:
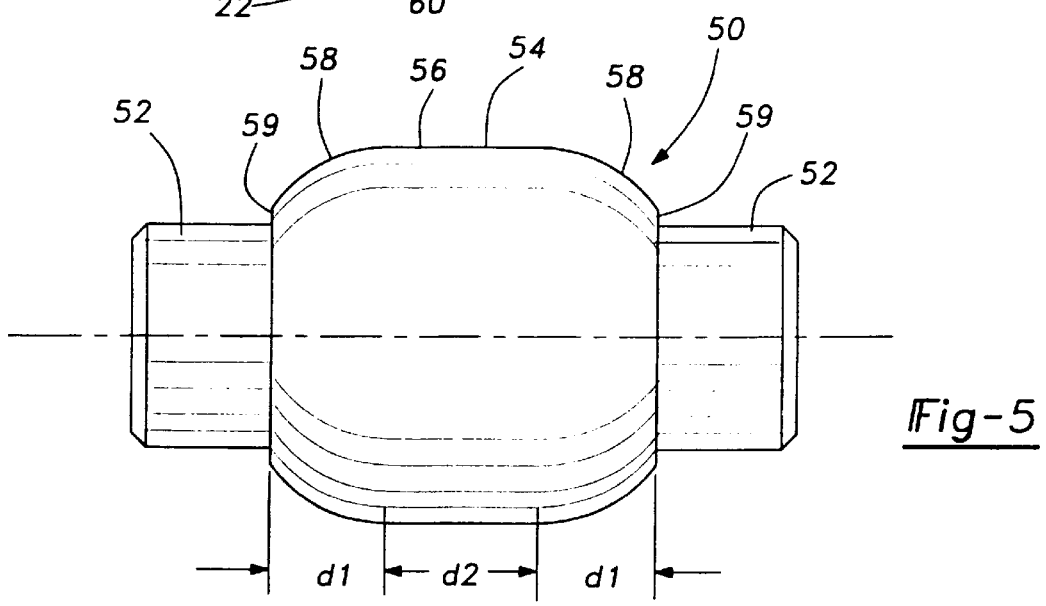
FIG. 5 is a view of the inventive roller.

As shown in FIG. 5, the roller 50 incorporates the shafts 52, the ledges 59, the curved surfaces 58, and the central cylindrical portion 56. In preferred embodiments, the curved surfaces 58 each extend for a distance $d^1$, which is preferably more than one-half the distance $d^2$ over which central portion 56 extends. That is, each of the curved edge surfaces 58 preferably extend for a distance that is more than one-half the distance of the central portion 56. In this way, the present invention ensures that there is adequate curved surface to handle any eventual inequality in the forces P1 and P2.

In one embodiment, the curved surfaces 58 each extended for 0.366", while the central surface 56 extended for 0.58". Thus, the two curved surfaces extended for 0.732", while the central portion extended for 0.580". In this roller, the diameter of central portion 56 was 1.25 inches. Again, it is preferred that each of the curved surface extend for a distance greater than one-half of the length of central portion 56. Preferably, the central portion 56 is at least axially as long as the edge surfaces. As mentioned above, the curved edge surfaces preferably curve away gradually as is shown in FIG. 5. In one embodiment, the radius of curvature R as shown in FIG. 5 was 0.481 inch. This was for a roller having the dimensions listed above. Preferably, the radius of curvature is constant through the entire edge surface. That is, the radius of curvature is preferably greater than the axial length of the curved surfaces. In this way, the present invention insures that the radius of curvature is gradual, and thus provides sufficient contacting surface. The radius of curvature R as listed above is measured at an angle of approximately 45° from the point X, which is defined by the center line of the roller, and the beginning of the curved edge surface 58.

A preferred embodiment of this invention has been disclosed, however, a worker of ordinary skill in the art would recognize that certain modifications would come within the scope of this invention. For that reason, the following claims should be studied to determine the true scope and content of this invention.

I claim:

1. A cam brake system comprising:
    a cam to be attached to a source of rotation and having a cylindrical roller contact surface;
    a pair of brake shoes, said brake shoes having webs with roller mounting surfaces; and
    rollers having central axes mounted to each of said shoes, and between said webs and said cam, said rollers including shoe mounting shafts at extreme axial ends, and a cam contacting surface extending between two axial ends and between said shoe mounting shafts, said cam contacting surface including a central cylindrical portion and curved edge surfaces at said axial ends of said cam contacting surface, said curved edge surfaces having a constant radius of curvature, said curved edges extending over an axial distance that is a substantial portion of the axial length of said cam contacting surface.

2. A cam brake system as recited in claim 1, wherein said curved edge surfaces curve radially inwardly from said central cylindrical portion toward each said axial end.

3. A cam brake system as recited in claim 2, wherein each of said curved edge surfaces extending for an axial distance that is greater than one-half of the axial length of said central cylindrical portion.

4. A cam brake system as recited in claim 3, wherein said central cylindrical portion is axially at least as long as said curved edge surfaces.

5. A cam brake system as recited in claim 1, wherein said shoe mounting shafts have an outer diameter that is less than an outer diameter of said cam contacting surface.

6. A cam brake system as recited in claim 5, wherein said shoe mounting shafts extend to a ledge, said ledge extending generally radially outwardly to said axial end of said cam contacting surface.

7. A cam brake system as recited in claim 1, wherein said curved edge surfaces curve gradually.

8. A cam brake system comprising:
    a cam to be actuated by a source of rotation;
    at least one brake shoe having at least one roller mounting surface; and
    a roller having a central axis and mounted to said shoe, and between said roller mounting surface and said cam, said roller including at least one shoe mounting shaft at an extreme axial end, said shoe mounting shaft defining an outer peripheral surface at a first radial distance from said central axis of said roller, a cam contacting surface extending between said shoe mounting shaft, and the other opposed end of said roller, said cam contacting surface including a central cylindrical portion, and two outer curved edge surfaces extending between said central cylindrical portion and axial ends of said cam contacting surface, said curved edge surfaces curving radially inwardly from axial ends of said central cylindrical portion to said axial ends of said cam contacting surface, said curved edge surfaces at said axial ends of said cam contacting surface being spaced from said axis by a second radial distance that is greater than said first radial distance, with a generally radially outwardly extending ledge connecting said shoe mounting shaft to said curved edge surfaces and wherein said curved edge surfaces each extend over an axial distance that is greater than one half of the axial length of said central cylindrical portion.

9. A cam brake system as recited in claim 8, wherein said curved edge surfaces each extending for an axial distance that is greater than one-half of the axial length of said central cylindrical portion.

10. A cam brake system as recited in claim 9, wherein said central cylindrical portion is axially at least as long as said curved edge surfaces.

11. A cam brake system as recited in claim 8, wherein, there are two of said brake shoes, each of said brake shoes having two of said roller mounting surfaces, there being a roller mounted to each of said shoes and said roller shoe mounting shafts being formed at each axial end of said roller, said shoe mounting shafts extending axially inwardly to said axial ends of said cam contacting surface.

12. A cam brake system as recited in claim 11, wherein a generally radially outwardly extending ledge connects said axially inner end of said shoe mounting shafts to said curved edge surfaces.

13. A cam brake system as recited in claim 8, wherein said curved edge surfaces curve gradually.

14. The cam brake system of claim 8, wherein said curved edge surfaces have a constant radius of curvature.

* * * * *